United States Patent [19]
Schepka

[11] Patent Number: 5,898,374
[45] Date of Patent: Apr. 27, 1999

[54] SUMP ALARM WITH RADON DETECTION

[76] Inventor: Louis F. Schepka, 1739 Brandon Ave., Youngstown, Ohio 44514

[21] Appl. No.: 08/802,416

[22] Filed: Feb. 18, 1997

Related U.S. Application Data

[63] Continuation-in-part of application No. 08/529,362, Sep. 18, 1995, Pat. No. 5,793,294.

[51] Int. Cl.$^6$ ............................................. G08B 21/00
[52] U.S. Cl. ..................... 340/603; 340/604; 340/605; 340/620; 340/632; 250/255
[58] Field of Search ............................ 340/616, 612, 340/618, 620, 605, 604, 450, 603, 632; 73/304 R; 250/255; 204/400

[56] References Cited

U.S. PATENT DOCUMENTS

| | | | |
|---|---|---|---|
| 4,140,912 | 2/1979 | Bressan et al. | 250/435 |
| 4,238,309 | 12/1980 | Zapparoli et al. | 204/400 |
| 4,812,648 | 3/1989 | Perlman | 250/255 |
| 4,859,854 | 8/1989 | Kershner | 250/374 |
| 4,891,514 | 1/1990 | Gjerdrum et al. | 250/255 |
| 4,975,575 | 12/1990 | Perlman | 250/255 |
| 5,048,334 | 9/1991 | Hampton et al. | 73/290 R |
| 5,661,835 | 8/1997 | Kato et al. | 385/92 |

*Primary Examiner*—Jeffery A. Hofsass
*Assistant Examiner*—Davetta Woods
*Attorney, Agent, or Firm*—Joseph H. Taddeo

[57] ABSTRACT

A galvanic cell is formed when ground water within a sump reservoir, tub or other pool, rises to contact electrodes constructed of dissimilar metals, the electrodes mounted in a bridge, with recessing, expansion brackets, to facilitate covering the sump hole and including an alarm device adapted to provide a warning signal should the water level exceed a predetermined level to contact the electrodes. Because an unsealed sump well is the major point of entry of radon gas, an scintillator with associated circuitry monitors the sump well to protect against the undesirable intrusion of radon gas. When the presence of radon is detected, an audible alarm is sounded when the level exceeds 4 picocuries per liter (4 pCi/L.).

28 Claims, 2 Drawing Sheets

5,898,374

SUMP ALARM WITH RADON DETECTION

REFERENCE TO PREVIOUSLY FILED APPLICATIONS

This application is a continuation-in-part of the prior Patent Application of Louis F. Schepka, identified by Ser. No. 08/529,362, Titled SUMP ALARM, filed Sep. 18, 1995, now U.S. Pat. No. 5,793,294. Benefit of the filing date for original disclosure material in the parent domestic application is claimed under 35 USC 120 and 37 CFR §1.53.

FIELD OF INVENTION

The present invention relates to a liquid level detection and alarm system having a pair of electrodes of dissimilar metals to sense the level of liquids, such as water, by producing a voltage and more particularly, to such a detection system utilizing a radon detector. This novel liquid level detection system protects against water damage by alarming when the level becomes appreciably high. The present invention finds application in sump pump water level alarms, Jacuzzi water overflow alarms and bilge water alarm systems. Other areas of application may include hot tubs, spas, saunas, whirlpools and swimming or wading pools.

A newly designed bracket provides for the universal mounting of the sensor probes in the sump reservoir. It is adjustable from a 9 inch to an infinite radius.

Inhalation of radon is known to be extremely hazardous to one's health. Because an unsealed sump well is the major point of entry of radon gas, the present invention finds application to protect against the undesirable intrusion of radon gas. When the presence of radon is detected, an audible alarm is sounded when the level exceeds 4 picocuries per liter (4 pCi/L.).

BACKGROUND OF THE INVENTION

There has been a need for an improved method of sensing the level of liquids, such as water, to sound an audible alarm in the presence of high water to prevent water damage. High water detection and alarm systems have been in use for some time.

One of the more common systems consists of a buoyant float that activates a switch closure to complete an electrical circuit, sounding an alarming device. These systems can be subject to various failures as the system ages and these failures may defeat the purpose of the alarm system; floats may develop pin holes and fill with water. Other possible modes of failure may include buoyant materials that eventually become saturated with the liquid and lose their buoyancy; pivots and other members that are subject to corrosion may stick, preventing reliable operation; switch contacts may oxidize, causing the alarm system to fail and not issue its warning.

Another type of level sensing system determines the fluid level by measuring the conductivity of water when its metallic electrodes are immersed in the water. In this type of system the electrodes are made of similar metals.

In 1883 Michael Faraday observed that pure water was an almost perfect insulator; whereas aqueous solutions of certain substances were electrically conductive. If two electrodes are dipped into a container of distilled water, and one electrode is connected to the positive terminal of a DC source, the other to the negative, practically no current flows. When a small amount acid, base or salt is added to the water, it provides, when dissolved in water, a solution whose resistance is sufficiently low for the current to be appreciable. A solution that conducts an electric current is called an electrolyte and this conduction phenomenon is more commonly known as electrolysis. The resistance of the solution depends markedly on the concentration and upon the temperature.

This system has the disadvantage of becoming unreliable when the probes oxidize over a period of time. If the process of oxidation occurs, the total measured resistance will increase dramatically.

Other liquid level sensing systems sense the change in capacitance within a vessel to determine the level of the fluid. These systems are rather insensitive because small changes in the height of the fluid are not easily or reliably determined from the very small changes in capacitance.

Another system of sensing the fluid level is by determining the change of resistance when a self heated thermistor is immersed into the liquid. A self heated thermistor has the disadvantage of being unreliable when cooled to much and tripping the alarm if the ambient temperature suddenly drops. Wind passing by an unprotected thermistor can also give a false nuisance alarm. Generally, this system is more costly to produce.

Radon-222 was first discovered in 1900 by the German chemist Friedrich Ernst Dorn. It is a dense, colorless, radioactive, inert gaseous element formed by the radioactive decay of radium. Its most stable isotope is Rn 222 having a half-life of 3.82 days, decaying by the emission of alpha particles into an isotope of the element polonium. Small quantities, formed by the decay of uranium minerals, are found in rock and soil, and radon makes up most normal background radioactivity.

Radon is naturally produced by the radioactive decay of uranium-238 that is present in soil and in rock formations. Radon is found in homes and other buildings that were built on black shale or uranium bearing soil. In these areas, an open sump well allows radon gas to enter into a dwelling.

There are several patents that disclose water level sensing and alarm systems.

U.S. Pat. No. 4,369,438, granted Jan. 18, 1983, to J. R. Wilhelmi discloses a sump pump detection and alarm system that generates an alarm in the event (1) high water is detected with power available, (2) high water is detected in the absence of power, or (3) when there is a power failure to the pump at any time.

U.S. Pat. No. 4,456,432, granted Mar. 1, 1984, to V. Mannino, discloses an emergency sump pump and alarm warning system comprised of an auxiliary battery powered sump pump that emits an intermittent audible and visual alarm when the battery powered sump pump is activated.

U.S. Pat. No. 4,841,282, granted Jun. 20, 1989, to G. A. Reis, discloses a liquid level detector for use in sump wells with a prior art smoke alarm of the ionization type contained in an electrically conductive housing and responsive to the pressure of a predetermined ionization level therein.

U.S. Pat. No. 5,314,313, granted May 24, 1994, to L. Janesky discloses an alarm system that sounds an audible alarm whenever the water level within a sump pump enclosure exceeds the operating level of the sump pump.

Therefore, it can be concluded that there exists a continuing need for the development of reliable and safe detection devices that can detect the presence of high water and the undesirable presence of radon gas. In this regard, this invention fulfills this need.

SUMMARY OF THE INVENTION

The present invention in its preferred embodiment relates to an improved high water detection system that is designed for use with sump pumps and to the detection and alarm for the presence of undesirable radon gas entering through an exposed sump well. Whenever the water level in a sump increases beyond a predetermined level or when the level of radon gas exceeds 4 pCi/L., an alarm is sounded.

The system is comprised of a novel liquid level sensor mounted to a newly designed universally adjustable bracket. A pair of insulated conductors connects the liquid level sensor to a remotely located wall mounted audible alarm. The battery operated alarm remains operational even when there is a prolonged loss of power.

The present liquid level sensor detects a voltage that is generated when its electrodes come in contact with the rising water within a sump.

The probe is comprised of two electrodes, each of which is made of dissimilar metals. The combination of two dissimilar metals immersed in an electrolyte constitutes a voltaic or a galvanic cell, named after Volta and Galvani, who first studied them. The principle of which the galvanic cell operates may be considered to be the opposite of an electrolytic cell.

In the preferred embodiment, the two electrodes used are aluminum and brass respectively. However, it should be understood that there are numerous other combinations of dissimilar metals that can be used, and should not detract from the spirit of this invention.

As a first step of understanding the principles of operation of the galvanic cell, consider what happens when the aluminum electrode is dipped into the water. Aluminum ions immediately go into solution. The chemical equation for this process may be written as follows:

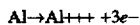

The presence of more aluminum ions in solution increases the reverse reaction rate; and the electrode potential decreases to a lower equilibrium value. It is evident that the equilibrium potential of the aluminum with respect to the solution depends upon the concentration of aluminum ions that surrounds the aluminum electrode.

Conversely, copper and tin ions go into solution surrounding the brass electrode. The chemical equations for this process are:

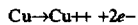

and,

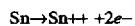

The ground water normally found in a sump reservoir forms the electrolyte of the system. This ground water is not generally a pure water that is devoid of ions. Today the ground water is contaminated with various salts and acids which makes it slightly conductive by decreasing its resistance.

Typically, the voltage that is generated when the aluminum and brass electrodes just barely touch the water is about 0.576 volts DC, and when not immersed or touching the water, 0.0 volts. When this voltage change is applied to the input of an alarm module, it provides an extremely sensitive, reliable and repeatable system.

The alarm module has an input voltage threshold of about 0.1 volts and when this voltage threshold is exceeded, an audible alarm in sounded. A battery provides an operating voltage for the alarm and sensing circuitry having a range from 7 to 11 volts. This module in normally mounted to the wall well above the expected limit of the rising water.

The bracket that holds the dissimilar electrodes is comprised of a plastic bar, and two formed metal end brackets. The plastic bar is 11.5 inches long, 2 inches wide and ⅛ of an inch thick. A hole at each end allows attachment to the formed aluminum brackets. These formed support brackets are free to be positioned so that the entire assembly can be fitted into various sized sump reservoirs. Once positioned, they are each held in place by two nuts and bolts. These brackets can be rotated to fit any size hole, ranging from a 9 inch radius to an infinite radius.

Another advantage of this newly designed bracket assembly is the use of stepped end brackets that mount 2 inches below the top of the sump reservoir. By recessing the bracket, it allows the sump cover to be placed on top without causing an interference.

In still another aspect of the present invention, a radon detection and alarm system is included to issue an alarm when the concentration of radon gas is exceeded.

Radon is found in homes and other buildings that were built on black shale or uranium bearing soil. When allowed to accumulate to high levels, it can be hazardous to long-term health. Because an unsealed sump well is the major point of entry of radon gas, the present invention finds application to protect against the undesirable intrusion of radon gas. When the presence of radon is detected, an audible alarm is sounded when the level exceeds 4 picocuries per liter.

Concentrations of the gas, however, are believed to pose a serious health hazard. Because such concentrations have been found indoors in areas with substantial radon decay, several U.S. northeastern states have developed programs to determine whether the gas is present in amounts high enough to pose a risk of lung cancer. The EPA has estimated that radon is responsible for roughly 20,000 deaths per year. Radon's appearance as a major health threat has only occurred in the last several decades. As awareness of radiation poisoning due to man-made sources has risen in recent years, so has the awareness of dangers relating to naturally occurring radon.

Past studies which have been performed on miners exposed to high radon concentrations reflect an increased rate of lung cancer and point to the need for caution when humans are exposed to high radon levels. Therefore, inhalation of radon can be extremely hazardous to one's health.

It is therefore an object of this invention to provide for a water level detection system that detects a DC voltage that is generated when two dissimilar metal electrodes come in contact with or are immersed in a fluid.

It is another object of this invention to provide for a water level detection system that provides reliable and repeatable performance when it detects a DC voltage that is generated when two dissimilar metal electrodes come in contact with or are immersed in a fluid.

It is still another object of this invention to provide for a water level detection system that provides increased sensitivity by detecting a DC voltage that is generated when two dissimilar metal electrodes come in contact with or immersed in the fluid.

It is yet another object of this invention to provide for a water level detection system that sounds an audible alarm when the water level exceeds a predetermined height.

It is still another object of this invention to provide for a water level detection system that has an audible alarm system that is battery operated to offer protection when a power failure occurs.

In addition, it is another object of this invention to provide for a water level detection system that is corrosion resistant because of the selection of materials and because the electrodes are not immersed in the liquid.

Also, it is still another object of this invention to provide for a water level detection system that has no moving parts that may be subjected to corrosion, such as floats and the like.

Additionally, it is still another object of this invention to provide for a water level detection system that has no additional moving parts that may be subjected to corrosion, such as switch contact closures that sound the alarm. The use of a solid-state alarm eliminates this problem.

One other object of this invention to provide for an adjustable and repositionable sump bracket that spans the sump reservoir. It can be installed in sump holes which range from a minimum 9 inch radius to and infinite radius.

An added object of present invention is the detection of radioactive gases in a radon detector, comprised of a scintillation counter and related circuitry that monitors for the undesirable presence of radon gas and issues an audible alarm should the concentration of radon exceed a predetermined level of 4 picocuries per liter.

Lastly, it is another object of this invention to provide for an adjustable and repositionable sump bracket that is recessed to allow the sump cover to be positioned over the sump hole without interference.

Further advantages will be apparent to those of ordinary skill in the art upon reading and understanding the following detailed description.

DETAILED DESCRIPTION OF THE PREFERRED EMBODIMENT

Figure 1:
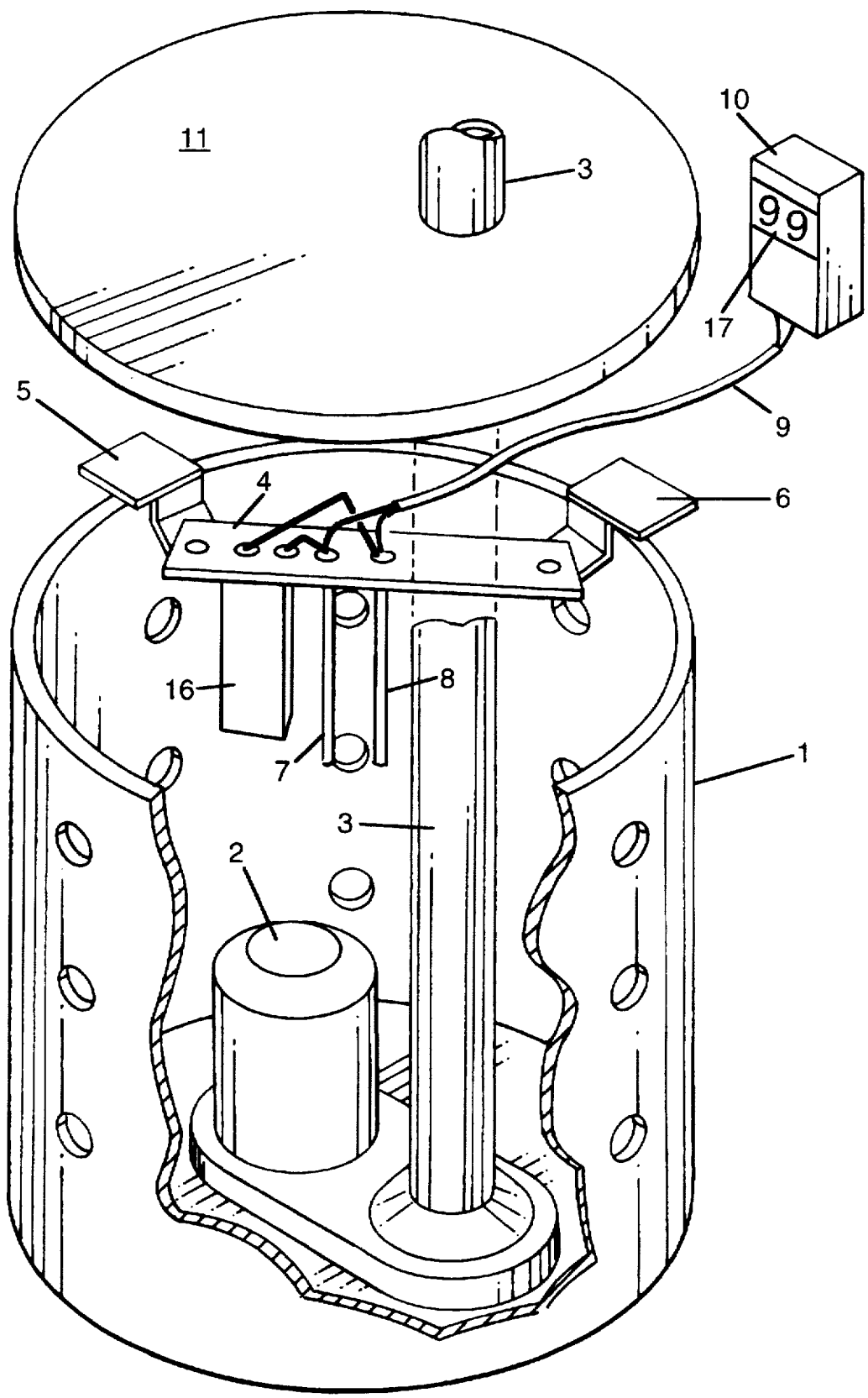
FIG. 1 is a detailed exploded view of the sump alarm system showing the dissimilar metal electrodes mounted to the universally positionable bracket.

With reference to the drawings, and in particular to FIG. 1, the preferred embodiment of the newly designed sump alarm utilizes a novel liquid level detection probe shown in its typical use in a sump environment.

The sump pump reservoir 1 is a liner for the sump hole that permits the submersible sump pump 2 to be placed in the bottom of the sump well. The sump pump 2 connects to discharge conduit 3 to direct the excess accumulation of water to an outside external drain.

The newly designed sump pump bracket is comprised of a plastic bridge 4. This plastic bridge measures 11.5×2.0× 0.375. Bolted to each end of the plastic bridge 4 are two repositionable recessed mounting brackets 5 and 6. These support brackets are made of aluminum and are dimensioned to recess the plastic bridge 2 inches. This support bracket assembly spans the opening of the sump and is adjustable for hole sizes ranging from 9 inches to infinity in radius.

Electrode 7 is comprised of a 6 inch long aluminum rod, 0.187 inches in diameter; electrode 8 is comprised of a 6 inch long brass rod, 0.187 inches in diameter. A pair of insulated conductors 9 connect the electrodes 7 and 8 to the wall mounted audible alarm 10. The sump cover 11 rests on top sump without interference from mounting support brackets 5 and 6.

Figure 2:
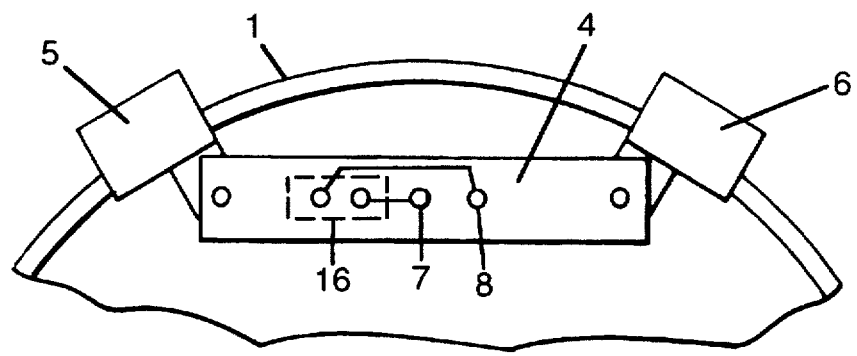
FIG. 2 is top sectional view of the universally positionable bracket as mounted in a sump hole.

Turning now to FIG. 2, where the top view of the mounting support bracket assembly is shown, the end brackets 5 and 6 are shown spanning the rim of the sump reservoir 1. Electrodes 7 and 8 are positioned in the insulated plastic bridge 4.

Figure 3:
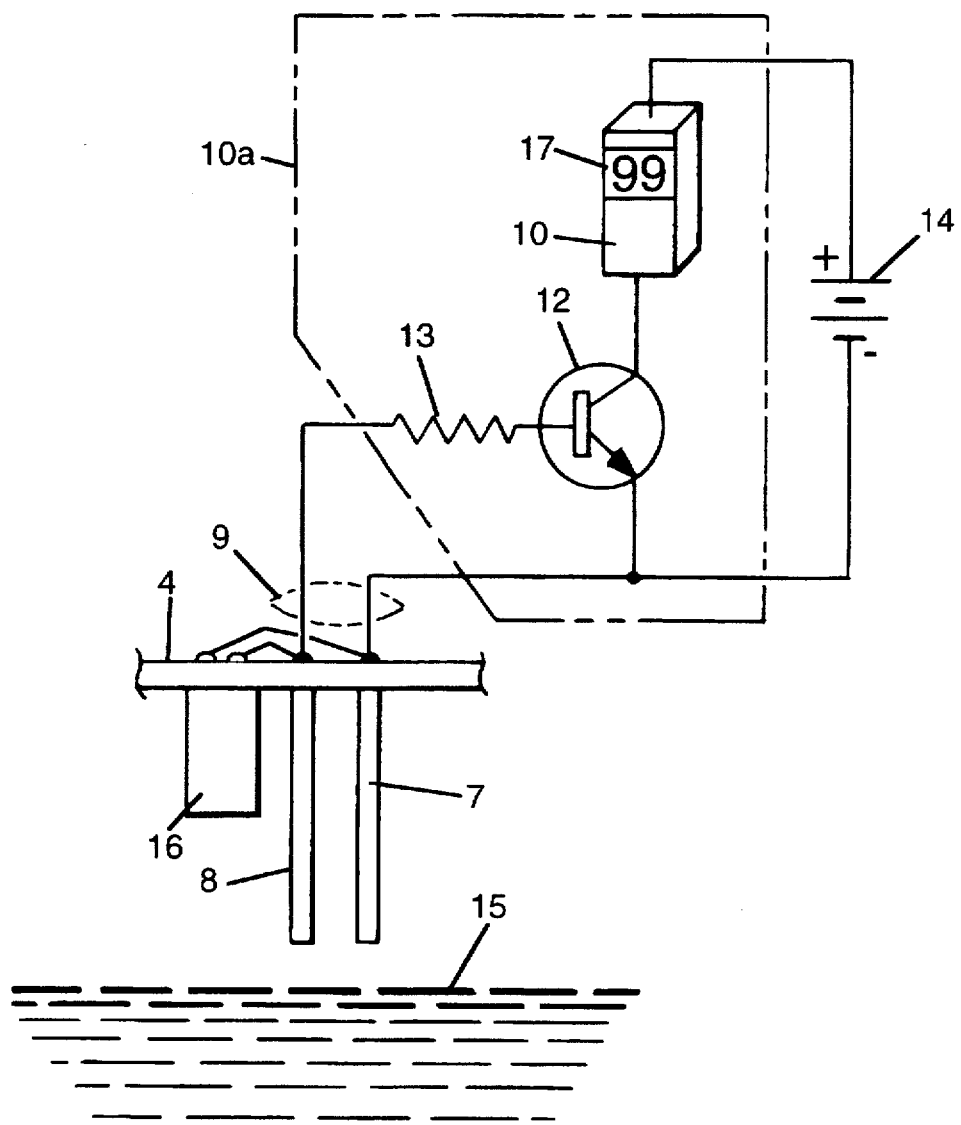
FIG. 3 is a schematic diagram showing the dissimilar metal electrodes connected to the alarm circuitry.

FIG. 3 is a schematic which shows the electrical connections from the dissimilar electrodes 7 and 8 to the alarm activation circuitry and subsequently, the alarm. The alarm module 10a is comprised of resistor 13, transistor 12 and an alarming device 10. Electrode 7 is made from an aluminum rod and connects to the emitter of NPN transistor 12. Brass electrode 8 connects to the base of NPN transistor 12 via protective resistor 13. The alarm device 10 connects to the collector of transistor 12 and to the positive terminal of battery 14. The negative terminal of battery 14 connects to the common connection of the emitter of NPN transistor 12 and aluminum electrode 7.

When the water 15 rises in level so as to touch and bridge the electrodes 7 and 8, a voltage of approximately 0.576 is generated. This generated voltage results in a minute current to flow into the base of transistor 12, causing the saturation of the emitter-collector junctions, thereby activating the audible alarm 10.

Referring again to FIG. 1, FIG. 2 and FIG. 3, a radon detector scintillation counter 16 is secured to the underside of bracket 4 so that it is immersed into the atmosphere of the sump well. The scintillation counter with its associated encased, watertight circuitry samples the air surrounding the sensor for a three day period. A running average of the samples are taken, so that over a seven day period, a computation of the short term average takes place. As the samples are taken, they are stored in an internal memory within the device. The average that is subsequently done is via a moving window, where the readings that were taken for the past several days are stored into memory using a circular buffer. Only the radon levels of the past seven days are used in the computation of the short-term readings. By using a running average with a moving window method of sampling, problems related to seasonal changes and weather related variations in the radon levels are obviated.

In order to alert the inhabitants of the dwelling of high radon levels, the audible alarm is sounded. The EPA suggested limit of 4 picocuries per liter is used as the threshold at which the alarming action takes place. The output of the scintillation counter and associated circuitry connects in parallel with the electrodes 7 and 8. The circuitry located within the scintillation counter module amplifies the integrated scintillation counter output to produce a voltage that is calibrated so that 0.576 DC volts equals 4.0 Picocuries per Liter.

The liquid level detection probe and the radon detector are alternately disposed, for in typical operation, when the level of water in the sump well increases to the level of the sensor electrodes, the detection is primarily that of being a sump level detector because the water level has displaced any radon gas present. When the water level recedes to a normal level, the present invention utilizes the radon monitor as its primary detection means. As such, the output of the radon detector module is normalized to the same trigger point as the liquid level alarm.

As shown in FIG. 1, a digital display 17 gives a readout of the current radon level. Typically, the display presents a reading up to 99 pCi/L, with a resolution of 1 pCi/L. If an alarm is sounded, the visual display is used to indicate and verify to the user that an excess of radon was detected and that some corrective action should be taken.

The details described are with reference to the preferred embodiment. Of course, modifications of this invention can occur to others skilled in the art upon reading this specification. However, it is not the intent to limit the invention to the exact construction details shown, but to include any modifications or alterations that fall within the scope of the appended claims or their equivalents.

I claim:

1. A liquid level detection system for a sump well, for use with a radon detector responsive to radon gas in excess of a predetermined hazardous level, the system comprising:

an alarm activation circuit including an alarm device and a power source;

a probe communicating on the circuit with the alarm device to generate an output voltage to the alarm upon liquid contact, the probe comprising first and second electrodes each constructed of a dissimilar metal suspended in a fixed, essentially parallel position over the well, and extending an essentially equal length into the well; and, the radon detector connected on the circuit with the probe and positioned near the probe to sample air in the well and to output a voltage and sound the alarm if excess radon gas is detected.

2. The liquid level detection system according to claim 1, wherein the radon detector includes a scintillator with a counter that samples radon over a period to time, whereby external variants that affect radon levels are obviated;

the scintillator further comprising an encased, watertight circuitry that includes a circular buffer memory and a readout display for storing and averaging air samples taken over a period of time; and, wherein the liquid level detection system and the radon detector are disposed for alternate operation, with liquid level detection precipitated by an increased liquid level to the electrodes and concomitant displacement of radon gas; and, radon detection occurs by entry of radon gas occasioned by a decreased liquid level in the well.

3. The liquid level detection system according to claim 2, further comprising a means for suspending the probe and the radon detector in a recessed position near a top of the sump well without interference with the probe or the radon detector, for complete well closure to prevent escape of fluids from the well without warning.

4. The liquid level detection system according to claim 3, further comprising a means for adjusting the suspending means to fit any size sump hole.

5. The liquid level detection system according to claim 4, the means for suspending comprising a bar having two ends to form a bridge over the sump well, the bridge adapted for insulated positioning of said first and second electrodes and the radon detector in the bridge; and, wherein the alarm is mounted to a wall in an area remote from the sump well above a highest anticipated liquid level.

6. The liquid level detection system according to claim 5, wherein the bridge further comprises a hole drilled therethrough at each bridge end;

wherein the means for adjusting comprises stepped support brackets rotatably positioned at each end of the bridge and held in place by fastener bolts through said hole at each bridge end;

wherein the probe and the radon detector each having a threshold voltage to the alarm; and, wherein the threshold voltage is normalized for said probe and detector.

7. The liquid level detection system described in claim 6, wherein said first electrode comprises aluminum and the second electrode comprises brass, whereby bridging the electrodes by contact with liquid generates a voltage of 0.576 volts DC for output to the alarm.

8. The liquid level detection system according to claim 7, wherein the circuitry of the scintillator amplifies the radon detector output to produce a voltage, calibrated at 0.576 DC volts equals the threshold level for radon gas, whereby the output of the radon detector module equals that of the probe having aluminum and brass electrodes.

9. A method for automatic detection of liquid and radon gas levels in a sump well, by use of an alarm with an activation circuit comprising a liquid level detection probe having first and second electrodes the probe responsive to liquid contact and in communication with the alarm and a power source, and a radon detector responsive to radon gas in excess of a predetermined threshold level, connected to the alarm, the method comprising the steps of:

suspending the probe and the radon detector in a fixed position over the well;

detecting a presence of excessive water or radon gas within the well;

generating an output voltage by the liquid level or radon detector for input to the alarm;

signaling a hazard concomitant with excess water or radon gas levels in the well.

10. The method described in claim 9, wherein each of the electrodes is constructed of said dissimilar metallic material.

11. The method of claim 10, wherein the first electrode comprises an aluminum rod and the second electrode comprises a brass rod.

12. The method of claim 11, wherein the electrodes are essentially parallel and of essentially equal length; and, the suspending step includes the steps of:

positioning the probe at a threshold liquid level; and, calibrating the radon detector for a threshold radon gas level.

13. The method of claim 12, further comprising the step of:

normalizing the radon detector for an output voltage to a trigger point voltage identical to the liquid level detector.

14. The method of claim 13, wherein the detecting a threshold level step includes the steps of:

closing the probe circuitry immediately upon contact of the probe with liquid; and, averaging radon gas detected over a period of time to obviate temperature related variations for radon gas detection.

15. The method of claim 14, wherein the generating a voltage step includes the step of:

outputing a voltage commensurate with the difference in potentials between the dissimilar metal electrodes upon liquid contact.

16. The method of claim 15, further comprising the step of:

disposing the liquid level detection probe and the radon detector for alternate operation, with liquid level detection consequent to an increased liquid level in the sump well and concomitant displacement of radon gas; and, whereby radon detection is incidental to a reduced liquid level.

17. A safety apparatus for sump wells that alternately provides liquid level and radon gas detection and a warning for presence of a liquid or radon gas above a preset level thereof, the safety apparatus comprising:

a probe installed on a circuit with an alarm module and a power source, the probe responsive to contact with a liquid by generating a first output signal voltage to the alarm; and the probe suspended over a sump well at a predetermined liquid level to protect against failure of a sump pump installed in the well;

a radon detector on the circuit and responsive to radon gas in excess of a predetermined hazardous level; the radon detector positioned near the probe to sample ambient air and provide a second output to the alarm upon radon gas detection above the preset level;

wherein the alarm module comprises a solid state alarm device; and wherein the apparatus has no moving parts.

18. The safety apparatus of claim 17, the radon detector connected on the circuit in parallel with the probe and further comprising a scintillator, a circular buffer memory, and a readout display, the radon detector adapted to provide an average of short-term readings for radon levels to obviate effects of temperature variations, whereby the second signal is output to the alarm if the average reading for radon gas exceeds a predetermined hazardous level, essentially 4 Pico-curies per Liter.

19. The safety apparatus of claim 18, the probe comprising first and second electrodes, each of the electrodes constructed of a dissimilar metal to form a galvanic cell for galvanic action between the electrodes by liquid contact.

20. The safety apparatus of claim 19, wherein said first electrode comprises aluminum and the second electrode comprises brass, whereby bridging the electrodes by contact with liquid generates a voltage of 0.576 volts DC for output to the alarm.

21. The safety apparatus of claim 20, wherein a circuitry of the radon detector amplifies an integrated scintillator output to produce a voltage, calibrated at 0.576 DC volts equals 4.0 Picocuries per Liter, whereby the output of the radon detector module is normalized to the same trigger point as the liquid level probe and alarm.

22. A liquid level detection system for a sump well in combination with a radon detector having a scintillator responsive to radon gases in excess of a predetermined hazardous level, the combination comprising:

an alarm activation circuit including an alarm device and a power source;

a probe communicating on the circuit with the alarm device; the probe comprising first and second electrodes each constructed of a dissimilar metal; the electrodes suspended in a fixed, position over the well to generate a voltage and sound the alarm when excess water of the sump well simultaneously contacts both of the electrodes; and, the radon detector connected on the circuit in parallel with the probe to output a voltage and sound the alarm if radon gases are detected in excess of the hazardous level.

23. The liquid level and radon detector combination of claim 22, wherein said first electrode comprises an aluminum rod and the second electrode comprises a brass rod, each electrode communicating with the alarm for generating a voltage of 0.576 volts DC, due to the ionic differential between the aluminum rod and brass rod electrodes, when excess water of the sump well simultaneously contacts both of the electrodes;

the radon detector further comprising a scintillator with an encased, watertight circuitry that includes a circular buffer memory and a readout display that provides an average of short-term readings for radon levels, whereby the probe and radon detector provide both a water level and a radon gas detector, that remain in a fixed position over the well and, that are not impede use by any requirement for relocation and resetting thereof;

means for suspending the liquid level detection probe in a recessed position near a top of the sump well, for positioning a sump hole cover over the well without interference with the probe or detector, for complete well closure that prevents escape of fluids from the well without warning; and, means for adjusting the suspending means to fit any size sump hole.

24. A method for detecting liquid and radon gas levels in a sump well, by use of an alarm with an activation circuit comprising a liquid level detection probe having first and second electrodes, each of the electrodes constructed of a dissimilar metal, the probe responsive to liquid contact and in communication with the alarm and a power source, and a radon detector responsive to radon gas in excess of a predetermined threshold level, connected in parallel with the probe to the alarm, the method comprising the steps of:

suspending the probe and the radon detector over the well;

detecting a presence of excessive water or radon gas;

generating an output voltage by the liquid level or radon detector for input to the alarm;

signaling a hazard concomitant with the water or radon gas levels in excess of the threshold level;

wherein the suspending step includes the steps of:

positioning the probe at a threshold liquid level; and, calibrating the radon detector for a threshold radon gas level;

wherein the method further comprises the step of normalizing the radon detector for an output voltage to a trigger point voltage identical to the liquid level detector.

25. The method of claim 24, wherein the detecting a threshold level step includes the steps of:

closing the probe circuitry immediately upon contact of the probe with liquid; and, averaging radon gas detected over a period of time to obviate temperature related variations for radon gas detection.

26. The method of claim 25, wherein the generating a voltage step includes the step of:

outputing a voltage commensurate with the difference in potentials between the dissimilar metal electrodes upon liquid contact.

27. The method of claim 26, further comprising the step of:

disposing the liquid level detection probe and the radon detector for alternate operation, with liquid level detection consequent to an increased liquid level in the sump well and concomitant displacement of radon gas; and, whereby radon detection is incidental to a reduced liquid level.

28. A safety apparatus for a sump well that alternately provides liquid level and radon gas detection and a warning for presence of a liquid or radon gas above a preset level thereof, the safety apparatus comprising:

a probe installed on a circuit with an alarm module and a power source; the probe in a stable position over a sump well at a predetermined liquid level and is responsive to contact with a liquid by generating a first output signal voltage to the alarm;

a radon detector on the circuit in parallel with the probe, the detector responsive to radon gas in excess of a predetermined hazardous level; the radon detector in a fixed position near the probe to sample air in the well and provide a second output to the alarm upon radon gas detection above the preset level;

wherein the detector further comprises a scintillator, a circular buffer memory, and a readout display, the radon detector adapted to provide an average of short-term readings for radon levels to obviate effects of whether and temperature variations, whereby the sec ond signal is output to the alarm if the average reading for radon gas exceeds a predetermined hazardous level;

the probe comprising first and second electrodes, each of the electrodes constructed of a dissimilar metal to form a galvanic cell for galvanic action between the electrodes by liquid contact; and, wherein a circuitry of the radon detector amplifies an integrated scintillator output to produce a voltage, that is normalized to the same trigger point as the liquid level probe and alarm.

* * * * *